United States Patent [19]
Furuya et al.

[11] 3,913,384
[45] Oct. 21, 1975

[54] WATER QUALITY DETERMINATION APPARATUS

[75] Inventors: Noboru Furuya; Eiji Fujimoto; Kenichi Amano; Tsuneo Tsukamoto; Nobuyuki Sato, all of Tokyo, Japan

[73] Assignee: Kabushiki Kaisha Meidensha, Tokyo, Japan

[22] Filed: Jan. 28, 1974

[21] Appl. No.: 437,350

[30] Foreign Application Priority Data

| Jan. 29, 1973 | Japan | 47-12739 |
| Jan. 29, 1973 | Japan | 47-11768 |
| Mar. 5, 1973 | Japan | 47-25913 |
| Mar. 5, 1973 | Japan | 47-25914 |
| Mar. 9, 1973 | Japan | 47-27807 |
| Mar. 9, 1973 | Japan | 47-27808 |

[52] U.S. Cl. .................. 73/53; 73/19; 73/61 R
[51] Int. Cl.² ........................................ G01N 33/18
[58] Field of Search ........... 73/53, 61 R, 61.1 R, 19, 73/54; 204/1 T, 195 R

[56] References Cited
UNITED STATES PATENTS

| 2,082,299 | 6/1937 | Nonhebel et al. | 73/53 |
| 3,214,964 | 11/1965 | Davis | 73/53 |
| 3,250,118 | 5/1966 | Johnson, Jr. | 73/53 |
| 3,382,706 | 5/1968 | Fitzgerald et al. | 73/54 X |
| 3,762,214 | 10/1973 | Bogusz | 73/61 R |

*Primary Examiner*—Richard C. Queisser
*Assistant Examiner*—Joseph W. Roskos
*Attorney, Agent, or Firm*—Waters, Schwartz & Nissen

[57] ABSTRACT

An apparatus comprising a sensor element immersed in a liquid to be examined for determining the amount of a matter in the test liquid which amount will be an index of the characteristics of the test liquid and means for moving the sensor element and test liquid relative to each other to clean the sensor element of sludge, oil and the like adhered thereto. The sensor element is accommodated in a housing and has a sensing face disposed parallel to the flow direction of the test liquid passing through the housing. In another embodiment of the invention, means is provided for generating pressure waves in the test liquid in contact with the sensing face of the sensor element to clean the sensing face of contaminants adhered thereto.

27 Claims, 38 Drawing Figures

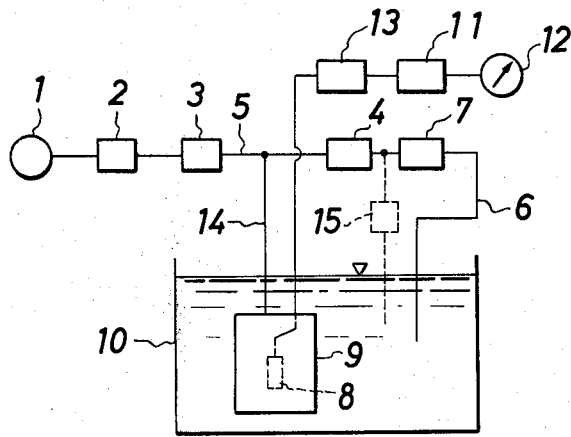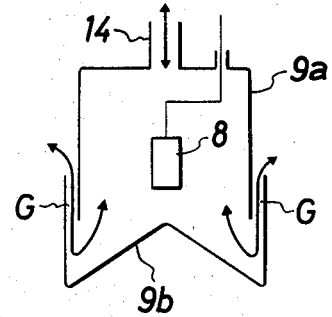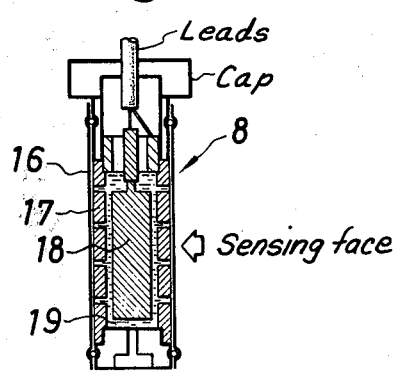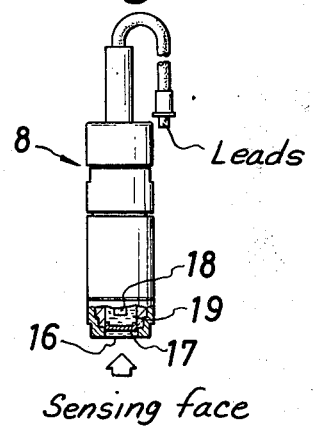

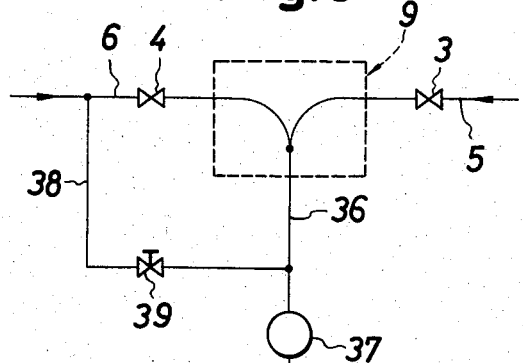
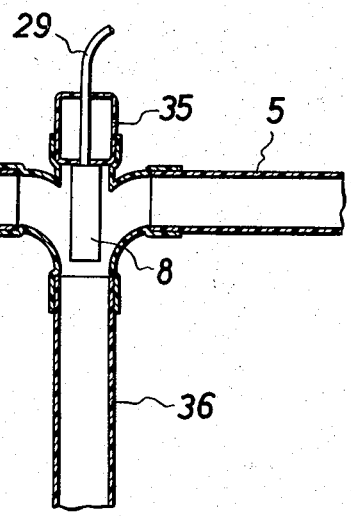
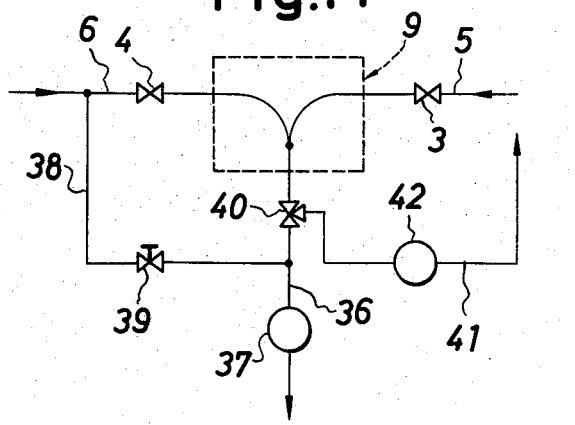
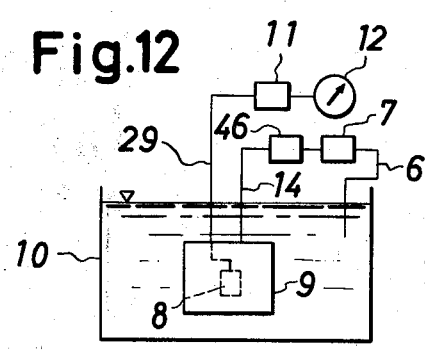
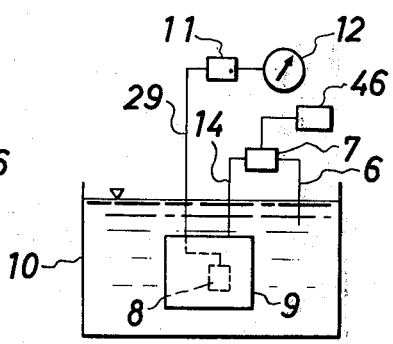

WATER QUALITY DETERMINATION APPARATUS

BACKGROUND OF THE INVENTION

This invention relates to an apparatus for examining water quality, particularly to a water quality determination apparatus in which the sensor element is placed in contact with the water under investigation to electrochemically determine indices representing water quality such as the amount of dissolved oxygen, concentration of hydrogen ions, oxidation-reduction potential and concentrations of various ions as well as such apparatus for optically detecting the turbidity or concentration of suspended matter.

Of the water quality determination devices of the kind described, the electrochemical type includes dissolved oxygen meters, pH meters, oxidation-reduction potentiometers, and other meters for determining concentrations of various ions by selective ion electrodes. The optical type includes immersed type turbidity meters and suspended solid concentration meters. The problem encountered in using these devices is that when used in polluted rivers, lakes and marshes and sewage and waste water, the sensing element as placed in contact with the water to be examined will become contaminated, requiring maintenance at short intervals of time to maintain the accuracy of measurement.

Taking the aforementioned dissolved oxygen meter by way of example, such meters in practical use for electrochemically evaluating the water quality by means of electrodes may be classified roughly into the following three types:

A. polarographic system (equipped with a membrane in front of the cathode),

B. galvanic cell system (equipped with a membrane in front of the cathode), and

C. galvanic cell system (equipped with no membrane in front of the cathode).

Considering the membrane type dissolved oxygen meters of the aforementioned devices from the standpoint of maintenance requirements, the membrane type meters have the following drawbacks:

a. lowering of sensitivity due to sludge, oils, soluble organic matters or the like sticking to those surfaces of the membrane which are placed in contact with the medium under investigation, b. deterioration of the electrolyte in the dissolved oxygen meter, and c. inaccuracy of measurement due to contaminations, such as hydrogen sulfide ($H_2S$), on the electrode surfaces and consumption of the electrodes.

Of the factors mentioned above, the item (a) is the primary factor which would make the device unusable unless maintenance operations are carried out at relatively short intervals of time. And it is the non-membrane type galvanic cell system that has overcome all of the drawbacks of the membrane type dissolved oxygen meter. However, the non-membrane type has its own inherent problems such as:

a'. lowering of sensitivity of the electrodes due to sludge, oils, soluble organic matter or the like attaching to the electrode surfaces in direct contact with the test water, b'. inability to measure test water having low conductivity at pH=7, and c'. greater liability to be affected by interference factors than the membrane type meter.

Although the factors (b') and (c') may not be of very great significance, the factor (a') is a serious defect. A known apparatus designed to overcome the defect (a') is that of Swiss Pat. No. 469,981 in which a grindstone is rotated to grind the electrode surface to thereby prevent the electrode from being contaminated. However, this apparatus is still incapable of extending the interval of time between maintenances operations due to the wear of the grindstone and collection of sludge in the interior of the sensing mechanism. Furthermore, this non-membrane type device is inferior to the membrane type in terms of linearity of signals.

Moreover, as is the case commonly with all the aforementioned types of dissolved oxygen meter, they have the disadvantages that they should move at a speed higher than 10 to 60 centimeters per second relative to the test water to achieve a high accuracy of measurement and that air bubbles should be prevented from being attached to the sensor section for a long time.

As is stated above, the dissolved oxygen meters currently in practical use are not capable of prolonging the intervals of time between maintenance operations when employed in heavily polluted rivers, lakes and marshes and sewage and waste water. On the other hand, although such dissolved oxygen meters are basically constructed to be able to effect continuous measurement, there are few cases in which continuous measurement is necessarily required to supervise or control the water quality by the use of a dissolved oxygen meter and other measuring instruments in combination. Accordingly, it is possible to lengthen the interval of time between maintenances operations by placing the sensor section in contact with the test water only during the measurement while during the stand-by period it is placed in contact with city water or treated water to reduce the chances of sludge, oils and other soluble organic matter clinging to the sensor element, the city water also serving or treated water to remove a small quantity of interference matter which adheres to the sensor during the measurement. However, in the case of the dissolved oxygen meter, there is a problem that the electrode (anode) is deteriorated faster if the city water or treated water contains a large amount of dissolved oxygen.

The phenomenon that the senssor section is contaminated to provide a lowered sensitivity during the determination of the characteristics of rivers, lakes or sewage and waste water is attributed to the fact that a boundary layer is formed between the sensor and the water under investigation due to the viscosity of the water in which layer the relative speed between the sensor and water is almost zero so that the contaminants present in the water are adsorbed, adhered or deposisted by sedimentation on the sensor surface. It follows that to prevent the contamination of the sensor, the contaminants in the water need to be kept from being adsorbed, adhered or deposited on to the sensor section. To accomplish this, it may be effective if an external force can be generated to cancel or reduce the forces tending to cause the contaminents to be adsorbed, adhered or deposited on the sensor surface. Such external force may be oriented either in an outward normal line direction of the sensor suface or in a direction tangential to the sensor. Suitable provisions need be made for creating this force.

One method of generating a force oriented in a direction tangential to the sensor surface is to provide as high a relative speed as possible between the sensor surface and the test water. In such case, as is rheologically known, a field of tangentially directed forces proportional to a value of $$\mu \frac{\alpha v}{\alpha y}$$

is produced wherein $\mu$ is the coefficient of viscosity, $v$ the relative speed component between the sensor surface and the test water and $y$ the distance in a normal line direction from the sensor surface to the water. It will be noted that such field of forces is achieved by making the boundary layer formed adjacent the sensor surface as thin as possible. The configuration of the sensor suitable for this purpose may be planar, pillar-like or cylindrical as will be described hereinafter. That is, preferred contours are of surfaces the generating line of which comprises a substantially straight line.

However, although this approach can theoretically reduce the thickness of the boundary layer, it cannot completely eliminate the layer. Therefore, the component of force applied normal to the sensor surface tending to attach contaminants thereto is not zero. Thus, if the boundary layer is constantly present, the sensor surface will become gradually soiled. However, this contamination will not proceed beyond a certain extent and there exists what may be called a critical degree of contamination. When the contamination exceeds this critical point, the tangential component of force becomes predominant so that the contaminating thin film is detached from the sensor. This phenomenon has been experimentally confirmed.

One method of creating a field of forces directed outwardly normal to the sensor surface is to generate a centrifugal field. Another method is to apply to the sensor surface pressure waves which may be generated in one way or another. A sudden change of the pressure thus caused in the boundary layer on the sensor surface produces a force in a direction in which the pressure decreases and in proportion to the pressure gradient. The contaminants attached or about to attach to the sensor surface are thus temporarily separated from the sensor. Then, it is only required to remove the thus detached contaminants in suitable way. The centrifugal field described above may be created by rotating the sensor section. The sensor surface should be disposed such that the centrifugal force acts in an outward normal line direction. The pressure waves may be produced by installing the sensor element in a conduit through which the test water is pumped and by opening and closing a valve disposed in the conduit or by momentarily varying the lift of the pump. Or alternatively, the pressure waves may be produced by imparting vibrations to the conduit or sensor element either mechanically or electromagnetically.

It has been found experimentally that increased effects may be obtained by coupling together fields of forces in directions tangential to and outwardly normal to the sensor surface. In this instance, even the field of force in an outward normal line as generated at a frequency of repetition as low as intervals of several to more than several tens of seconds and at a duty cycle as low as a few percents is highly effective and can remove almost 100 percent of the contaminants completely.

However, even if the contaminants may be totally removed, the dissolved oxygen meter will gradually deteriorate in its output over a long period of time since it comprises a cell (battery) generating electricity by means of an oxygen gas. In other words, the sensing sensitivity will gradually be lowered. This decrease of sensitivity is attributed to the deterioration the electrodes, particularly the anode and this is inevitable with cells currently commercially available. Based on the recognition of the lowering of the sensor sensitivty during the use of the dissolved oxygen meter (whether it may arise out of the degeneration of electrodes or deposition of a small amount of contaminants), the decrease of the sensor sensitivity may be prevented, thereby to further lengthen the period during which the maintenance is not required, by automatically compensating for a deviation of the output of the sensor as compared with a reference value.

Accordingly, an object of the present invention is to provide an electrochemical or optical water quality determination apparatus permitting operation over a long maintenance-free interval of time.

Another object of the invention is to provide a water quality determination apparatus capable of automatically removing contaminants from the sensor element by a simple arrangement.

Still another object of the invention is to provide a water quality determination apparatus capable of automatically calibrating a decrease of the sensor sensitivity resulting from contamination thereof.

SUMMARY OF THE INVENTION

In one embodiment of the present invention, the sensing device of the apparatus is provided with means for moving that portion of the water under investigation which is brought into contact with the sensor section to generate a turbulent flow therein. The water moving means may include a feed pump for moving the test water through the sensing device from a source of the test water, or for feeding city water from a source thereof through the sensing device, or an air-compressor for feeding compressed air into the sensing device. In addition, the housing of the sensing device surrounding the sensor section is constricted in inner diameter in the portion thereof adjacent the sensor section so as to increase the velocity of the test water flowing in the vicinity of the sensor to aid in the generation of the turbulent flow.

In another embodiment of the invention, the sensor section may be provided with means for applying pressure waves to the sensor to remove the contaminants therefrom. Said means may comprise either a piston or bellows assembly adapted to be reciprocated to create pressure waves in the test water within the sensing device or a tube of flexible material communicating with the sensing device, said tube being adapted to be deformed by external forces to produce pressure waves in the fluid therein.

In still another embodiment of the apparatus according to the present invention, the sensor section of the sensing device includes means for passing air having a prescribed oxygen content to the sensor section and a servomechanism for controlling the output of the sensor section so that the output of the sensor as obtained when exposed to said air shows no deviation from a reference level whereby the decrease of the sensitivity may be automatically calibrated.

Further objects and the entire scope of applicability of present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the accompanying drawings wherein like reference numerals have been generally employed for the same or similar elements:

FIG. 1 is a diagramatical view illustrating an embodiment of the present invention;

FIG. 2 is a schematic view of a sensing device for use in the apparatus of FIG. 1;

FIG. 3 is a time chart showing the operation of the apparatus of FIG. 1;

FIGS. 4 and 5 are schematic sectional views of conventional electrodes which may be used as sensor elements for the sensing device of FIG. 2;

FIG. 9 is a circuit diagram of another embodiment of the apparatus according to the present invention which may be employed at a location remote from a water source under investigation;

FIG. 10 is a schematic sectional view of a sensing device for use in the embodiment of FIG. 9;

FIG. 11 is a circuit diagram of an alternate form of the apparatus shown in FIG. 9;

FIG. 12 is a block diagram illustrating an embodiment of the apparatus according to the present invention equipped with a pressure wave generator;

FIG. 13 shows an alternate form of the apparatus of FIG. 12;

DETAILED DESCRIPTION OF PREFERRED EMBODIMENTS

Figure 6:
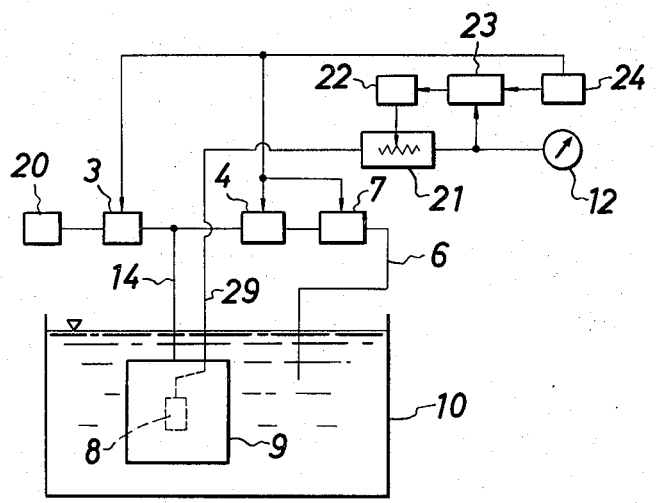
FIG. 6 is a block diagram of an embodiment of the apparatus according to the present invention equipped with means for calibrating the change of an indicator due to contamination of the sensor section.

In FIG. 1, reference numeral 1 indicates a water source for supplying city water or treated water to the water quality determination apparatus; 2 is a means such as a deaerator for reducing the amount of dissolved oxygen in the city water or treated water from the water source 1; 3 and 4 are means such as solenoid valves for opening and closing water lines 5 and 6, respectively; 7 is a means such as a pump for drawing up the test water; 8 is a conventional sensor element or section for detecting the amount of dissolved oxygen; 9 is a sensing device incorporating the sensor 8; 10 represents a source of water to be examined such as a river, lake or marsh or aeration tank; 11 is an amplifier for amplifying signals from the sensor element 8; 12 is an indicator for indicating an amplified signal; and 13 is a gate for interruptedly transmitting signals from the sensor section 8 to the amplifier 11. As shown in FIG. 2, the sensing device 9 comprises a housing composed of opposed enclosure members 9a and 9b separated by a gap G, the arrangement being such that appropriate water flows will be produced in the vicinity of the sensor element 8 disposed within the housing and that air bubbles will not be drawn in from the outside. A water line 14 leads from the housing 9a, 9b into the solenoid valves 3, 4.

The operation of the form of apparatus shown in FIGS. 1 and 2 will now be described with reference to FIG. 3. While the solenoid valve 3 is in its open position, the solenoid valve is closed with the pump 7 inoperative. During this portion of the operation cycle, the water from the source 1 is introduced into the sensing device 9 to flow around the sensor element 8 to thereby prevent the contamination of the sensor and then the water flows through the gap G into the test water tank 10. During this period, the gate 13 is kept closed so that measurement of the amount of dissolved oxygen in the test water is not carried out. Then, concurrently with closing of the solenoid valve 3, the solennoid valve 4 is moved to an open position and the pump 7 is also activated. Upon the activation of the pump 7, the test water in the tank 10 is admitted into the sensing device 9 and pumped up through the water line 14 and returned through the water line 6 to the tank 10. After the area around the sensor element 8 has been filled with nothing but the test water, the gate 13 is opened to effect the measurement of the amount of dissolved oxygen. On completion of this measurement, the cycle is restored to the initial condition as described above. Thus, the cycle is repeated while the measurement of the amount of dissolved oxygen in the test water intermittently takes place.

If the alternate repetition of activation and nonactivation is not desirable for the pump 7, a separate solenoid valve 15 as shown in broken lines in FIG. 1 may be provided to recirculate the pumped up test water to the tank while measurement is not taking place. It will be understood that this arrangement permits the continuous operation of the pump 7 with alternate actuations of solenoid valves 4 and 15.

In the construction of the apparatus of FIG. 1, depending upon the type selected of the sensor element 8, if for example a pH meter is selected for the sensor, the deaerator 2 may be eliminated and the pump 7 may be submerged in the test water. In addition, detergents or dilute hydrochloric acid may be added to the water source 1 to provide increased cleaning effects for the sensor section 8.

The problem with the apparatus of the aforesaid Swiss Pat. No. 469,981 is that the useful life of the grindstone is short and that sludge is apt to collect in the housing in which the electrode-grindstone arrangement is disposed. If the apparatus of said patent is to be adapted to the apparatus described above according to this invention, the aforesaid drawbacks to the apparatus in the Swiss patent can be overcome by eliminating the enclosure members 9a, 9b and providing means such that the electrode will be ground by the grindstone only while the electrode is in contact with the test water.

Furthermore, according to the present invention, even if the test water in the tank 10 is stationary, an appropriate flow of the water may be obtained around the sensor element 8 by the operation of the pump 7 to prevent sludge or the like from settling. In addition, the gap G between the enclosure members 9a and 9b helps to keep upwardly rising air bubbles from entering the sensing device so that the possibility of the bubbles contacting the sensor section 8 is reduced.

As is stated above, the apparatus according to this invention is so arranged that the measurement system for circulating the test water to and from the sensor element and the cleaning water for supplying clean treated water to the sensor section may alternately be opened and closed by means of the switching means associated with the water lines of the respective systems, so that the measurement of the water quality is performed by the measurement system while the sensor section which may have been contaminated with the test water is cleaned by said cleaning system during the nonmeasurement cycle to always keep the sensor section clean. Thus, the time interval between maintenance operation of the sensor section can be effectively lengthened.

The construction of conventional sensor sections 8 is illustrated in FIGS. 4 and 5. Shown in FIG. 4 is, for example, a Mackereth electrode type sensor section in which determination of dissolved oxygen is performed at the side faces of the sensor. Shown in FIG. 5 is, for example, a Clark electrode type sensor section in which dissolved oxygen is measured at the forward end face of the sensor. Both are of the galvanic cell system and the outer surfaces of a cathode 17 are covered by a closely fitting membrane 16 highly permeable to oxygen. Contained within the sensor are an anode 18 and an electrolyte 19. When an appropriate load resistance is connected between the two electrodes with the sensor element 8 immersed in the liquid under investigation, dissolved oxygen passes through the membrane 16 into the interior of the sensor with the result that the following electrode reaction occurs:

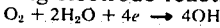

$$O_2 + 2H_2O + 4e \rightarrow 4OH$$

Thus, an electric current is produced in proportion to the amount of dissolved oxygen so that the dissolved oxygen content can be determined by measuring said electric current.

Figure 7:
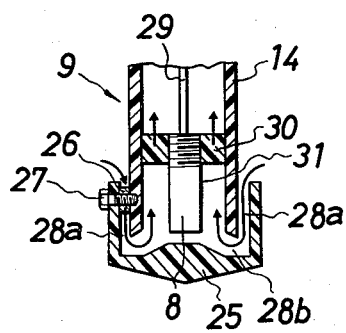
FIGS. 7 and 8 are fragmentary schematic sectional views of sensing devices which may advantageously be used in conjunction with the apparatus of FIG. 6.
Figure 8:
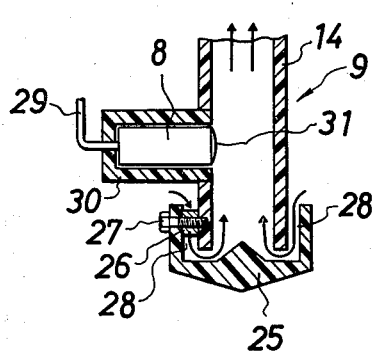

FIGS. 6 through 8 illustrate a second embodiment of the present invention. In this embodiment, it is contemplated to retard contamination by the test water of the membrane surface in the case of the membrane type sensor or the electrode surface in the case of the non-membrane type. A gradually occurring decrease in the sensitivity of the sensor is compensated by exposing the sensor element of the device to the air and adjusting the span of a signal transducer by means of a servomechanism to automatically calibrate or adjust the device. Thus, an extended maintenance-free interval can be provided.

Only those portions of this embodiment different from the preceding embodiment will be described in the following description. It should be understood that this will also be the case with the other succeeding embodiments.

An air source 20 such as an air compressor is employed in place of the water source of the embodiment of FIG. 1. A signal transducer 21 converts an electrical signal generated from the sensor element 8 and transmits it to an indicator 12 as a signal proportional to the amount of dissolved oxygen. A span adjustment means 22 such as a variable resistance is provided for adjusting the span of the signal transducer 221. A servomechanism 23 comprising a servoamplifier, servomotor, etc. receives an output signal from the signal transducer 21 with which the servomechanism compares its self-contained reference signal and controls the span adjustment means 22 in the direction to eliminate the difference between the two signals. A timer 24 supplies signals to the selector valves 3 and 4, pump 7 and servomechanism 23, respectively in a predetermined time sequence.

FIGS. 7 and 8 show the details of the sensing devices 9 as may be utilized in the system of FIG. 6. Shown in FIG. 7 is the sensing device incorporating the aforementioned sideface sensing type electrode such as a Mackereth electrode as a sensor element. Shown in FIG. 8 is the sensing device incorporating the forward-end face sensing type electrode such as a Clark electrode.

In FIG. 7, disposed substantially centrally within the lower portion of the conduit 14 in communication with the air source 20 and pump 7 to pass air and the test water therethrough is the sensor element 8 extending axially with respect to the approximately lowermost end of the conduit and supported by support means 30 which is of such configuration as not to interfer with the flow of the test water. The support means extends across the conduit 14 and is secured to the inner wall surface of the conduit. Mounting of the sensor element 8 to the support means 30 may be achieved by a threaded connection between mating male and female threads formed in the sensor and support means, respectively. The lower end portion of the conduit 14 may be beveled upwardly and inwardly so as to facilitate introduction of the test water into the conduit. A tubular cap 25 having an inner diameter greater than the outer diameter of the conduit 14 concentrically surrounds the lower portion of the conduit and is secured thereto by spacer means 26 and bolt means 27 with a radial clearance 28a and vertical clearance 28b between the cap and conduit. The inner surface of the bottom of the cap 25 is generally frustroconically convex so as to facilitate upward passage of the test water and to prevent the water pressure from acting on the bottom of the sensing device. A signal line 29 extends from the top of the sensor element to the signal transducer 21.

As the test water is first directed downward through the gap 28a and then into the conduit 14 as indicated by the arrows in FIG. 7, air bubbles in the test water, which have a relatively small specific gravity, will not descent and are therefore unlikely to enter the conduit.

The bottom of the cap 25 of the sensing device 9 in FIG. 8 is likewise configured in a similar manner as the cap of FIG. 7, except that the cap in the embodiment of FIG. 8 is generally conical to aid in the flow of the test water upwardly through the conduit 14. The sensor element 8 is housed within rectangular or cylindrical support means 30 connected to the wall of the conduit 14 adjacent the lower end thereof and extending radially inwardly therefrom. The sensor element 8 is sealed in the support means 30 except for the sensing face 31 which is exposed in the interior of the conduit 14 in such manner as to be approximately in alignment with the inner wall surface of the conduit. In this instance, a signal line 29 leads from that end of the sensor element 8 opposite the sensing face 31. The sensing face 31 refers either to the membrane surface in the case of an electrode having a membrane thereon or the surface of the electrode itself in the case of one of non-membrane type.

In the sensing devices shown in FIGS. 7 and 8, the sensing element 8 is disposed in the housing or conduit 14 adjacent the lower end thereof so that the face 31 of the sensor is subjected to the non-uniform (turbulent) flow of the test water entering through the lower end of the housing to thereby remove the contaminants from the sensing face 31.

It is noted that the membrane or electrode surface 31 is so oriented as to be parallel to the flow direction of the test water. This arrangement permits the dynamic pressure due to the flow of the test water to wash away contaminants such as sludge, oils, soluble organic matter and the like tending to stick to the sensing surface 31 to thereby reduce the chance of such contaminants clinging to the sensing surface. This is one of principal functions of the sensing devices 9 illustrated in FIGS. 7 and 8.

The operation of the measurement system will be described with reference to FIG. 6. An automatically calibrating schedule is preliminarily mounted in the timer 24. Signals are normally supplied to the valves 3 and 4, pump 7 and servomechanism 23 to close, open, activate and stop those component parts, respectively. Thus, the pump 7 is in operation so that the test water in the tank 10 is drawn through the clearances 28 in the sensing device 9 into the conduit 14 and circulated through the conduit 14, valve 4 in its open position, pump 7 and conduit 6 back to the tank 10.

The amount of dissolved oxygen in the test water is determined by the sensor element 8 as the water is drawn through the gaps 28 into the conduit or housing 14. A signal emitted from the sensor is conducted through the signal transducer 21 to the indicator 12. Although the output signal from the signal transducer 21 is also applied to the servomechanism 23, the latter is not activated by the signal since it is kept inoperative under the control of the signal from the timer 24.

When the time preset in the timer 24, that is, the time for automatic calibrating operation has been reached, the timer issues a signal to open the valve 3, close the valve 4, deenergize the pump 7 and places the servomechanism 23 into a condition ready for operation. When this occurs, air is injected from the air source 20 through the valve 3 and conduit 14 into the sensing device 9 so that the sensor element is exposed to the air as the sensing device is filled with air, and excess air is blown out through the clearances 28. During exposure to the air, the sensor section 8 detects the amount of oxygen in the air and transmits a signal representing the detected oxygen to the transducer 21. An output signal from the transducer 21 is then applied to the servomechanism 23 which is now in a condition ready for operation. The signal is compared with the reference signal set in the servomechanism. Any deviation which may occur between said output signal and the reference signal causes the operation of the servomechanism according to the deviation signal whereby the span of the signal transducer 21 is adjusted through the span adjusting means 22 until the deviation becomes null. It is thus to be understood that any decrease of sensitivity of the sensor element with use is compensated by automatically calibrating the oxygen meter by adjusting the span of the transducer 21 through the span adjustment means 22. This automatic calibration is based upon the fact that the oxygen content in the air is always constant. More specifically, if a deviation signal is produced when comparison is made, after a certain period of use, between the reference signal and a signal representing the oxygen content in the air which is always constant, it indicates a lowering in sensitivity of the sensor element. The present invention contemplates calibrating the oxygen meter in an amount which corresponds to the lowering. Upon completion of the adjustment in a certain period of time, the timer 24 produces a signal again to close the valve 3 and open the valve 4. And an operation initiating signal and operation stopping signal are sent to the pump 7 and servomechanism 23, respectively. The various sections are thus brought into normal condition.

The repetition of this cycle periodically carries out the automatic calibration of the dissolved oxygen determination apparatus to thereby maintain the accuracy of measurement constant for a long time as well as extending the maintenance-free intervals. Furthermore, exposing the sensor element to the oxygen in the air also provides a cleaning effect to remove contaminants from the sensor.

As has been stated above, during the normal operation, the test water is passed through the sensor section 8 by the pumping action of the pump 7. After the lapse of a certain time during which, it is assumed, there will occur a degeneration in the sensitivity of the sensor element, the pumping of the test water is interrupted and air is introduced from the air source 20 into the sensing device 9 to expose the sensor element 8 to the air. If a deviation signal is generated upon comparison of the signal proportional to the oxygen content in the air with the reference signal, the span of the signal transducer 21 is adjusted in accordance with the magnitude of the deviation signal. Thus, the present invention enables the lengthening of the maintenance-free intervals required as compared with the prior art dissolved oxygen meter and prevents lowering of the accuracy of measurement. In addition, since the test water is drawn up by the pump 7, an appropriate predetermined flow velocity of the water is obtained around the sensor element 8, so that the sensing device may be used both when the test water may be stationary as, for example, in a lake or marsh and when there may be a violent change in the speed of current. Furthermore, since the test water flows parallel to the face 31 of the sensor element 8 within the sensing device, the dynamic pressure of the water serves to reduce the likelihood of contaminants adhering to the sensor face. It is to be noted that this arrangement alone is effective in prolonging the maintenance-free intervals. It will be apparent from the foregoing that the sensing device 9 as constructed as shown in FIG. 7 or 8 in combination only with pump 7, signal transducer 21 and indicator 12 can sufficiently lengthen the maintenance-free intervals as compared with the prior art apparatus.

Moreover, with the sensing device 9 constructed as illustrated in FIGS. 7 and 8 and described above, almost none of the air bubbles which may be produced as the test water is drawn downward through the gaps 28 will be entrained in the water to the interior of the sensing device since the bubbles tend to rise upward due to their small specific gravity. Consequently, the chance of the air bubbles being brought into contact with the sensor element is greatly reduced, contributing to the lengthening of the maintenence-free intervals.

Although not shown in FIG. 6, prior to the aforesaid automatic calibration by means of the air, clean water instead of air may be passed through the sensing device using the same line for the air to clean the sensor element, and thereafter the air may be passed to effect the automatic calibration. Furthermore, the direction of the water current passing through the sensing device by the pump may be reversed with substantially the same functional effects as in the embodiment of FIGS. 6–8.

FIGS. 9 to 11 illustrate embodiments of the invention in which water quality determination is made at a location remote from a polluted water source, using galvanic cell type said-face sensing electrodes with membranes.

The liquid under investigation may be passed through line 6 and valve 4 into the left-hand branch of a 90° bent Y-joint, for example, constituting a housing of a sensing device 9 as defined by dotted lines while cleaning water is passed through line 5 and valve 3 to the right-hand branch of the Y-joint. The details of the 90° turned Y-joint are illustrated in FIG. 10. A sensor element or electrode 8 is disposed substantially centrally in the Y-joint and in the passages for the liquid to be examined and the cleaning water and it is secured to the joint by means of a cap 35. An electrical signal detected at the electrode 8 is passed through cable 29 to a D.C. amplifier and an indicator, not shown. The branch pipe of the Y-joint for discharging the liquid is connected to a line 36 and then to a pump 37.

The valves 3, 4 are in the form of solenoid-operated two-way valves, the arrangement being such that upon deenergization of the associated solenoids, the valve 3 is opened and valve 4 closed while upon energization of the solenoids, the valve 3 is closed and valve 4 opened. The measurement cycle and cleaning cycle may be set by a timer depending upon the characteristics of the water under investigation and the purposes of measurement. The pump 37 is continuously operated to pass the liquid under investigation or cleaning water into the sensing device 9 at or above a predetermined flow velocity. A bypass line 38 with a manually-operated valve 39 is provided to regulate the flow rate through the line 6 into the sensing device 9.

During the measurement, the electric current is disconnected from the solenoids of the valves 3 and 4 so that the liquid under investigation is passed through the line 6, sensing device 9 and pump 37 at a flow velocity above a predetermined value. The cleaning water is blocked from entering the sensing device through the line 5 by the valve 3 in its closed position. For the cleaning cycle, electric current is supplied to the solenoids of the valves 3 and 4 at preset intervals of time, so that the valve 4 is closed to divert the liquid under investigation to pass through the bypass 38 to the pump 37 while the valve 3 is opened to permit the cleaning water to pass through the line 5, sensing device and line 37 at or above a predetermined flow velocity.

FIG. 11 illustrates an alterate form of the system of FIG. 9 in which an additional line is provided to recover the cleaning water during the cleaning cycle. More specifically, a three-way solenoid valve 40 is disposed in the discharge line 36. Connected between the valve 40 and the source of cleaning water are a line 41 and pump 42 so that during the cleaning cycle, the cleaning water is circulated through the lines 5, 6 and 41. In this case, the solenoid of the valve 40 is energized to close the line 36 on the outlet side of the valve 40. On the contrary, upon deenergization of the solenoid of valve 40, the line 36 is opened on the outlet side of the valve while the branch line 41 is closed.

If water whose quality is known is employed as the cleaning water, it is possible to effect automatic calibration of the electrode and D.C. amplifier.

Those component parts, namely, the housing and lines of the illustrated apparatus which are placed in contact with the liquid are made of polyvinyl chloride.

In the embodiment of FIGS. 9–11 as described above, liquid to be examined is introduced into the sensing device at an adequate flow velocity by at least one pump, and at desired intervals of time, cleaning water is passed at a high flow velocity to the Y-joint in which the electrode 8 is accommodated. The arrangement described above produces the following advantages:

3. Since it is required to locate the line 6 only adjacent a source of liquid to be examined, the maintenance of the line 6 is not required in contrast to the prior art arrangement in which a sensor electrode is immersed directly in the source of liquid under investigation.

In addition, location of a sensor electrode at a convenient place remote from a source of liquid to be examined serves to reduce the difficulties, time and labor as encountered in maintenance of the electrode in the prior art arrangement as well as permitting a safer and easier maintenance even at a place attended with danger such as an aeration tank.

2. Although in this embodiment, the housing of the sensing device as defined by the dotted lines is illustrated as a Y-joint, this housing may be dimensioned or configured in accordance with the electrode used.

3. Due to the liquid under investigation always flowing through the apparatus at a sufficiently high flow rate, the liquid in the apparatus is continuously refreshed to prevent solid matter from sticking to the lines.

4. The liquid under investigation having an adequate flow velocity takes little time to flow through an appropriate length of line into engagement with the electrode 8 to ensure quite an accurate measurement in that the change with time of the quality of the water source under investigation can be detected at the electrode with virtually no time delay.

5. The adequate flow velocity at which the liquid under investigation flows through the lines 6 and 36 serves to substantially reduce the disturbance caused to the water quality of the water under investigation around the electrode due to the electrode being placed in the water, as compared with the arrangements in which an electrode is inserted directly in a liquid source under investigation.

6. Due to the adequate velocity of flow with which the liquid under investigation passes through the electrode, the adherence of solid matter to the electrode surface can be reduced to a considerable extent as compared with the arrangement in which an electrode is inserted directly in the source of liquid under investigation.

7. The apparatus in this embodiment is equipped with the self-cleaning mechanism which performs a scouring function with clean water at desired intervals of time. Since in this mechanism the two-way solenoid valves 3 and 4 are remotely controlled by a programmed timer, the electrode face can always contact fresh liquid to be examined so that it is not necessary to carry out maintenance servicing on the electrode in short periods as is the case with the prior art. Combined with the effects mentioned under the item (5) above, this facilitates the maintenance servicing and improves the life of the apparatus and the accuracy of measurement.

8. As shown in FIG. 11, provision of the three-way solenoid valve 40, branch line 41 and pump 42 enables efficient utilization in the circulation of clean water, standard solution or any other suitable liquid the characteristics of which are known.

9. In the apparatus of this embodiment, the use of cleaning water of liquids the characteristics of which are known or standard solutions will enable automatic calibration of the electrodes and the D.C. amplifier, obviating the necessity of maintenance operations on such component parts and enhancing the reliability of measurements in contrast to the conventional apparatus.

10. Those parts of the appratus which are placed into contact with the test liquid are made of corrosion resistant material and the flow lines are made of synthetic resins such as polyvinyl chloride, so that the serviceable life of the apparatus is lengthened.

11. The apparatus of this embodiment having the aforementioned advantages may be used in conjunction with conventional electrodes to perform automatic electrical control of the dissolved oxygen content in an aeration tank.

Figure 14:
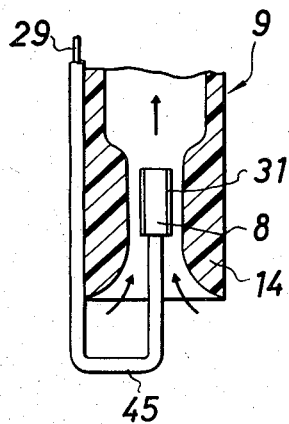
FIGS. 14 and 15 are schematic sectional views of sensing devices for use in the apparatuses of FIGS. 12 and 13.
Figure 15:
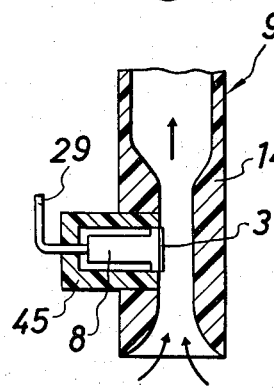
Figure 16:
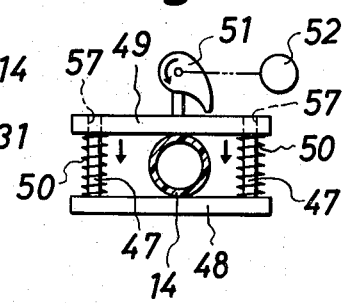
FIGS. 16 through 18 are schematic views of pressure wave generators for use in the apparatusses of FIGS. 12 and 13.
Figure 17:
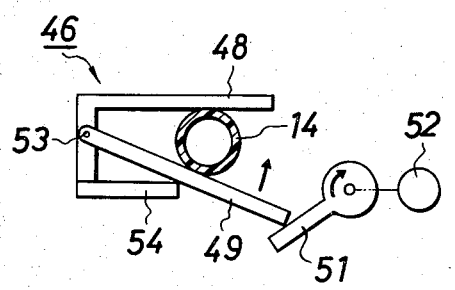
Figure 18:
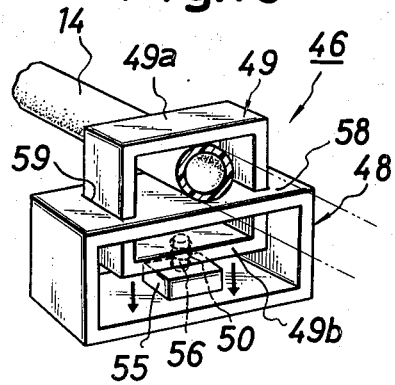
Figure 19:
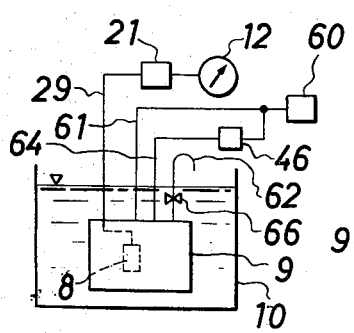
FIG. 19 is a block diagram representing a still another form of the apparatus according to the invention having a pressure wave generator.

FIGS. 12 to 18 illustrate embodiments of the invention having a pressure-wave generator which will be described with respect to the components different from those of the preceding embodiments. When used with a side-face sensing type sensor element, sensing device 9 is axially disposed centrally in the lower portion of conduit 14 and supported by mounting means 45, as shown in FIG. 14. The mounting means 45 extends axially some distance beyond the lower end of the conduit 14 and is there radially outwardly bent and then extends upwardly to be secured to the outer wall of the conduit 14. The support means 45 also includes a signal line 29 extending coaxially therethrough. The inner diameter of the conduit 14 is made smaller around the sensor element 8 than that of the remaining portion of the conduit so that the flow rate of the test water may be increased along the sensing faces on the sensor to produce turbulence to thereby diminish the adherence of sludges and the like. The conduit 14 is flared outwardly at its inner lower surface to form a conical surface to thus facilitate introduction of the test water into the conduit. Alternatively, in the case of a forward end face sensing type sensor element 8 as illustrated in FIG. 15, conduit 14 having an inner contour similar to that of the conduit of FIG. 14 is employed to increase the flow velocity in the vicinity of the sensing face. The sensor element 8 is retained in a support means 45 which is in turn mounted on the conduit 14. More specifically, the sensor element 8 is entirely enclosed by the support member 45 radially extending from the conduit 14, except for the sensing face 31 which is exposed to the interior of the conduit and is in alignment with the inner wall of the conduit. A pressure wave generator means is disposed in a flow passage communicating with the sensing device 9 and pump 7. The pressure wave generator may comprise a conventional fluid valve or other means as illustrated in FIGS. 16 through 18 and is described more specifically later.

One form of pressure wave generator 46 as shown in FIG. 16 comprises a fixed plate 48 and an opposing movable member 49 embracing highly flexible resilient conduit 14 therebetween. The movable member 49 is provided with oppositely disposed aperatures 57 loosely receiving oppositely disposed rods 47 which are secured to the fixed plate 48. Provided between the fixed plate and movable member are coil springs 50, surrounding the rods 47, 47. The coil springs normally urges the movable member 49 upwardly to such a position as not to block the passage of the test water through the flexible conduit 14. Disposed above the center of the movable plate 49 is a cam 51 which is rotated by a drive means 52 to depress the movable plate downwardly. In the illustrated embodiment, each rotation of the cam causes one stroke of downward movement of the movable plate.

An alternate form of pressure wave generator 46 is shown in FIG. 17 and includes a fixed plate 48 having an L-shaped section. A movable member 49 having an elongate shape in section is pivotally connected at one end to the short leg of the L-shaped fixed plate by a pin 53 such that flexible conduit 14 is embraced between the fixed plate 48 and movable member 49. The other end of the movable member is adapted to be engaged by cam 51 which is disposed adjacent the movable member and is rotated in a vertical plane by means of a drive means 52 to press upwardly against the conduit 14. Connected to the end of the short leg of the L-shaped fixed plate is a stop member 54 extending parallel to and in the same direction as the long let of the L-shaped plate. The stop member serves to prevent overshooting of the movable member in its return movement.

In another alternate form of pressure wave generator shown in FIG. 18, a box-shaped movable member 49 is vertically movably mounted in openings 59 formed in the top plate 58 of a fixed member which is also box-shaped. Flexible conduit 14 is inserted between the top plate 49a of the movable member and the top plate 59 so that upon downward movement of the movable member 1 the conduit is compressed between the two members. This downward movement of the movable member is accomplished by means of a solenoid rod 56 which is connected at an outer end to the lower plate 49b and adapted to be downwardly retracted upon energization of a solenoid magnet 55 which is secured to the lower plate of the fixed plate 48. Disposed between the lower plate of the movable member and the solenoid magnet is a coil spring 50 surrounding the solenoid rod 56 and normally urging the movable member 49 upwardly so as not to block the passage of the test water through the conduit.

The operation of the embodiment of the invention as described immediately above is as follows. Upon activation of the pump 7 shown in FIG. 12, the test water is drawn in and up through the conduit 14 in the direction as indicated in FIG. 14 or 15 at a predetermined flow rate and passed through the pressure wave generator 46, pump 7 and conduit 6 for discharge back into the tank 10.

Assuming that the test water is to be examined with respect to the dissolved oxygen content therein, the amount of dissolved oxygen is measured as the test water is passed through the sensor section 8 and a signal proportional to the measured oxygen is transmitted through the signal line 29 to the amplifier 11 and indicator 12 to provide a reading of the measured oxygen content.

During this operation, contaminants will adhere to the sensing face 31 on the sensor element 8, which contaminants, if allowed to stand, will cause a gradual decrease in the accuracy of measurement. To avoid this, in a predetermined period of time, the pressure wave generator 46 is actuated to produce pressure waves to clean the sensing face 31 of the adhering matter. More specifically, when the pressure wave generator 46 as shown in FIG. 16 is used, for example, the cam 51 is rotated by the drive means 52 to depress the movable member 49 whereby the conduit 14 is compressed to either interrupt the passage of the test water therethrough or diminish the flow rate for a predetermined time. Then, after the lapse of a predetermined time, the engagement of the cam 51 with the movable member 49 is abruptly released to allow the movable member to rapidly return to its original position under the influence of the biasing force of the spring 50 so that the test water is permitted to flow violently through the conduit. Consequently, pressure waves are applied to the sensing face 31 of the sensor to sweep the sensing face free of the contaminants adhered thereto.

FIG. 13 illustrates an alternate form of the apparatus equipped with a pressure wave generator in which a timer device is utilized as the pressure waver generator 46. The timer device provides an output signal to control the pump 7 so that the lift of the pump is abruptly changed to produce pressure waves, whereby the same effects as in the embodiment of FIg. 12 are obtained.

As is stated above, the systems illustrated in FIGS. 12 to 18 are arranged to apply pressure waves to the sensor element 8 disposed in the conduit 14 at predetermined time intervals to prevent adherence of contaminants thereto. The lowering of the sensitivity of the sensor element due to the adherence of contaminants is thus almost completely avoided to thereby lengthen the time interval between maintenance operation as well as permitting accurate measurements for a long period of time. In addition, the use of the arrangements as illustrated in FIGS. 16 to 18 as pressure wave generators serves to preclude blockage of the conduit by the debris in the test water. Furthermore, the pumping up of the test water by the use of a pump continuously presents fresh test water to the sensor element.

FIGS. 19 to 24 show still further forms of the apparatus having pressure wave generators according to the present invention. These embodiments will also be described only with regard to the components different from the preceding embodiments. The reference numeral 9 indicates an air-list pump serving as a sensing device, the specific constructions of preferable forms of air-lift pumps being illustrated in FIG. 21 through 24. An air supply source 60 in the form of, for example, an air compressor is provided to supply air through a pipe 61 to the air-lift pump 9. At predetermined time intervals air from the air source 60 is selectively supplied to a pressure wave generator 46 in the form of a solenoid valve through which the air is passed to the air-lift pump 9.

Figure 21:
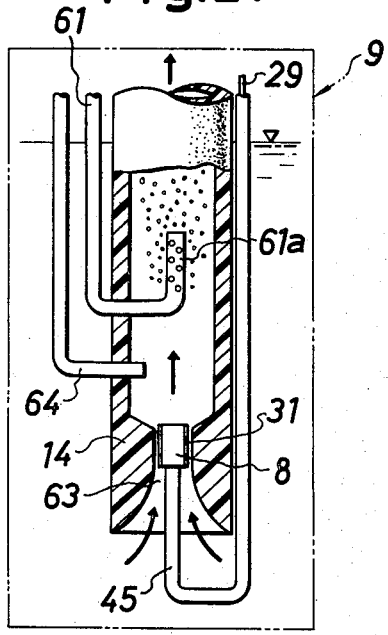
FIGS. 21 through 24 are schematic sectional views of several forms of sensing devices for use in the apparatuses of FIGS. 19 and 20.

In the form of the air-lift pump as shown in FIG. 21, the configuration of the lower inner surface of the conduit 14 and the disposition of the sensor element 8 in the conduit are similar to the embodiment of FIG. 14. The conduit 14 forms a housing of the sensing device or air-lift pump 9, said housing communicating ultimately with a test water discharge line 62 having a valve 66 disposed therein. The test water is drawn up through an inlet passage 63 as indicated by the arrows. The pipe 61 in fluid communication with air source 60 extends into the conduit through the side wall thereof above the sensor element 8 and turns upwardly approximately in the center of the conduit, terminating in a spray end 61a formed with small holes to discharge air therethrough. Extending through the side wall of the conduit slightly below the pipe 61 is a pipe 64 for introducing pressure air into the conduit.

Figure 22:
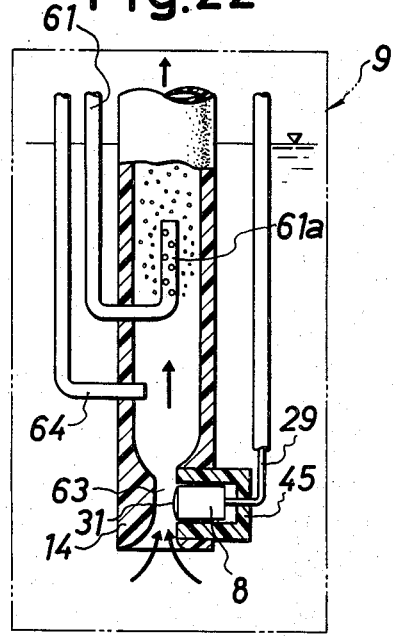

The air-lift pump 9 illustrated in FIG. 22 is identical to the embodiment of FIG. 21 except for the disposition of the sensor element 8 which is similar to that of the sensor in FIG. 15.

Figure 23:
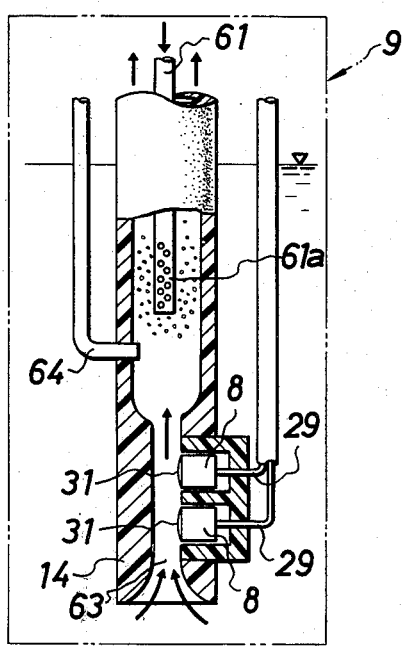

An alternative form of air-lift pump shown in FIG. 23 is structurally similar to the embodiment of FIG. 22 except that there are two forward-end face sensing type sensors 8 disposed in side-by-side relationship and the pipe 61 is placed vertically in the conduit from above.

Figure 24:
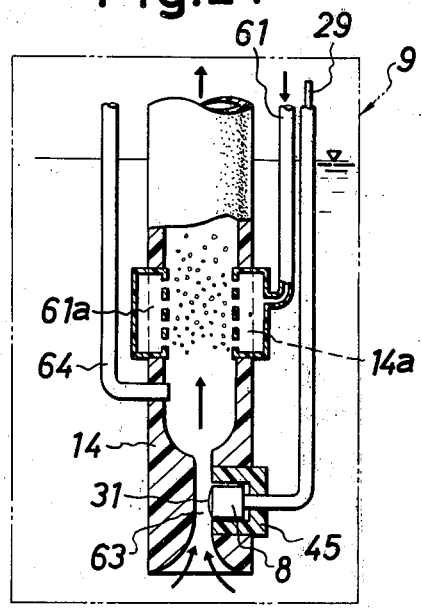

In another form of air-lift pump shown in FIG. 24, an annular channel member 61a is provided in the conduit 14 approximately at the level of the air spray ends 61a in the preceding embodiments. The annular channel has approximately the same inner diameter as that of the conduit and is perforated in its inner wall with a plurality of small holes to spray air therethrough. A pipe 61 is connected with annular channel air spray member 61a to supply air to the latter. The remaining construction is the same as in the embodiment of FIG. 22.

The operation of the embodiments of FIGS. 19 to 24 will now be described. The air bubble supply source 60 is operated to pass air through the pipe 61 to the spray member 61a. The air is then discharged through the small perforations in the spray member 61a as air bubbles to reduce the apparent specific gravity of the test water in the housing 14, so that the test water is drawn up in the direction as indicated by the arrows in FIG. 21 due to the presence of the air bubbles and is passed around the sensor element 8 at a predetermined flow rate.

Assuming that measurement is taking place in the same manner as described in connection with the preceding embodiments, contaminants will stick to the sensing face 31, resulting in a gradual decrease in the accuracy of measurement. However, a solenoid valve may be used as the pressure wave generator, said valve being normally closed to prevent the passage of air through the pipe 64. The solenoid valve may be opened one or several times in each desired period of time to pass air through the pipe 64 to the air-lift pump 9 to thus produce pressure waves in the housing 14 whereby adhered matter is cleaned from the sensing face 31. At this time, the valve 66 is activated to close the conduit 62 to prevent the pressure waves from leaking upwardly. The liquid in the housing 14 is forced to go out of the housing downwardly through the inlet thereof.

Figure 20:
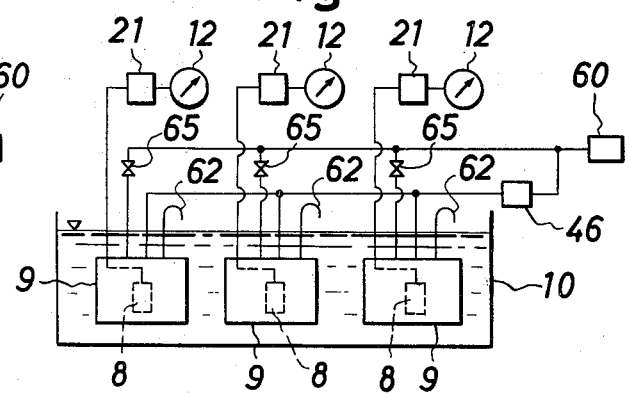
FIG. 20 is a block diagram of a system comprising a plurality of the apparatuses shown in FIG. 19.

FIG. 20 shows an economical form of the apparatus in which there are disposed a plurality of sensor elements 8. A single air supply source 60 supplies air to each of the air-lift pumps 9 through its respective flow regulating valve 65, and air from a single pressure wave generator 46 is also supplied to each of the air-lift pumps. Each sensing device is operated in the same manner as described above.

Although the various preceding embodiments have been described as using air, it should be understood that oxygen, nitrogen and other stable gases may be used instead of air. Moreover, although in the foregoing embodiments the pressure wave generator 46 is provided separately from the air bubble producing system, the pressure wave generator may be disposed in the pipe 61 to eliminate the pipe 64. It is also to be understood that the air supply source may be directly controlled to control the supply of air.

If the test water contains such as hair, rubber bands and the like, no inspection is required in the embodiment of the invention described immediately above in contrast to the prior art apparatus, since according to the invention the test water is drawn up by an air-lift pump which is of simple construction involving no movable parts. Furthermore, when air or oxygen is used to operate the air-lift pump, some aeration effects may be obtained.

FIGS. 25 to 30 illustrate still other embodiments of the invention having a pressure wave generator in which a sensing device comprises a jet pump. A feed pump 67 pumps up city water or treated water separately from water to be examined and supplies such clean water to the jet pump or sensing device 9 through a conduit 61 and a pressure wave generator comprising, for example, a solenoid valve. The specific constructions of several forms of jet pumps according to the invention are illustrated in FIGS. 27 to 30. For this embodiment the pressure wave generator 46 as illustrated in FIG. 18 may be used.

Figure 27:
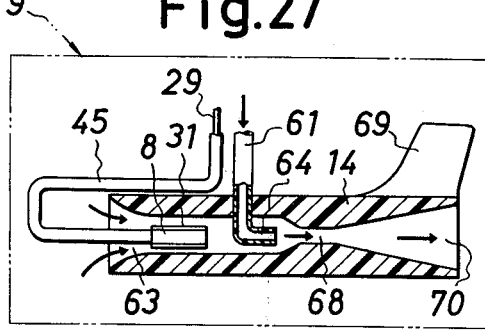
FIGS. 27 through 30 are schematic sectional views of several forms of sensing devices useful for the apparatuses of FIGS. 25 and 26.

In the form of jet pump as shown in FIG. 27, a housing 14 is suspended substantially horizontally in the source of water 10 under investigation. A sensor element 8 is disposed in the housing 14 on the inlet side thereof. The sensor element and the contour of the inner wall of the housing on the inlet side are similar to those of the embodiment in FIG. 14. However, the housing is formed on its outlet side with a throat portion 68 and a contiguous diffuser portion 70 in diameter progressively toward the outer end. The pipe 61 leading from the feed pump 67 extends through the side wall into the housing 14 and terminates in a nozzle extending axially toward the throat 68. Extending vertically upwardly from the outer periphery of the housing 14 adjacent its downstream end is a directional rudder 69. When there is a current in the water under investigation, such as in a river or aeration tank, the rudder 69, although not necessarily required, is effective to always maintain the sensing device suspended in the test water in the direction of the current to enhance the performance of the sensing device.

Figure 28:
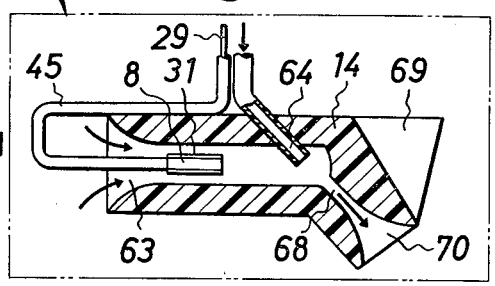
Figure 31:
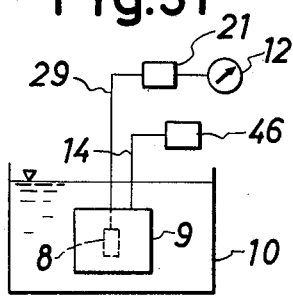
FIG. 31 is a block diagram representing a further alternate form of the apparatus according to the invention equipped with a pressure wave generator.

Shown in FIG. 28 is an alternate form of the jet pump in which the nozzle 64 and diffuser 70 are inclined forwardly and downwardly.

Figure 29:
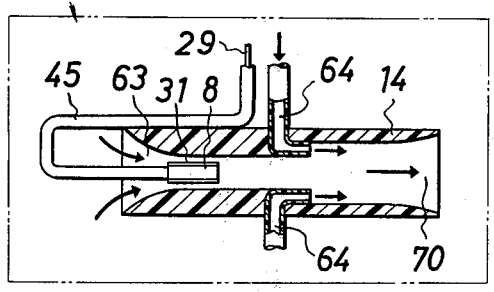

FIg. 29 illustrates still another form of the jet pump in which, instead of the provision of a throat portion, two nozzles 64 are disposed axially along the inner surface of the housing 14 and face toward the outlet end thereof. The bore of the housing on the downstream sice is enlarged in diameter by an amount corresponding to the total diameters of the two nozzles so as not to impede the passage of the test water.

Figure 30:
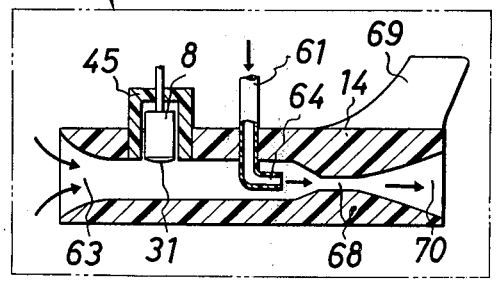

An alternate form of the jet pump shown in FIG. 30 is identical in construction to the embodiment of FIG. 27 except that the disposition of the sensor element 8 and the inner contour of that portion of the housing around the sensor are similar to the forward end face sensing type arrangement as shown in FIG. 15.

Figure 25:
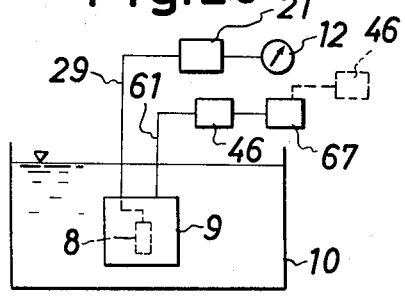
FIG. 25 is a block diagram representing yet another form of the apparatus according to the invention equipped with a pressure wave generator.

The operation of the embodiments of FIGS. 25 to 30 will be described below. The pump 67 of FIG. 25 is activated to pump up service water and pass it through the pressure wave generator 46 and conduit 61 to the nozzle 64 through which the water is discharged as a high velocity jet toward the throat. As this jet of water passes through the throat 68, a low pressure is generated to draw in the test water through the inlet 63 of the housing to be mixed with the water from the nozzle 64 and discharged through the outlet 70 of the sensing device 9. The test water thus passes by the sensor surface at a predetermined flow rate.

While the same measurement as described hereinabove in connection with the other embodiment is taking place, contaminants will adhere to the sensing face 31 and will, if allowed to stand, be gradually detrimental to the accuracy of measurement. However, according to this invention, the pressure wave generator 46 is actuated at predetermined time intervals to remove the adhering contaminants from the sensing face 31.

Although in this embodiment, the pressure wave generator 46 is disposed between the feed pump 67 and jet pump 9, it may be arranged as shown in dotted lines in FIG. 25 that the feed pump may be directly controlled to cause a sudden change in the pump lift.

If a decrease in efficiency is not important, the jet pump may be installed on the ground.

Figure 26:
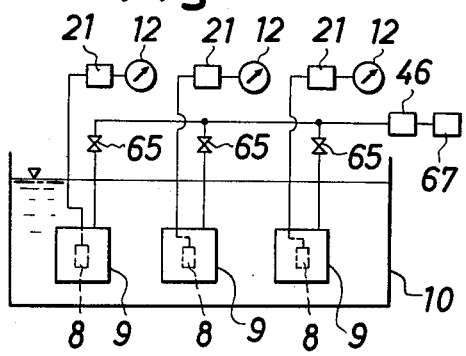
FIG. 26 shows an alternate form comprising a plurality of the apparatuses of FIG. 25 in combination.

FIG. 26 illustrates an economical arrangement in which a plurality of sensor sections are disposed. Feed water pumped up by a feed pump 67 is passed through a pressure wave generator 46 and distributed through flow regulating valves 65 to each of the jet pumps 9. The measurement is carried out in the same manner as described immediately above.

As is indicated above, in the embodiment of FIGS. 25 to 30, water pumped up by the feed pump 67 is supplied to the jet pump 9 through the pressure wave generator. The thus discharged jet water causes the test water to move along the sensor element for measurement, whereby substantially the same cleaning effects as in the embodiment of FIGS. 19 to 24 are obtained.

Figure 32:
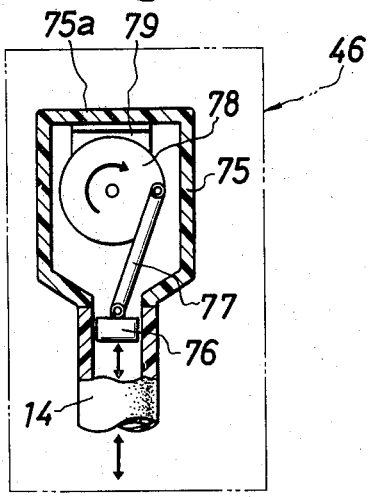
FIGS. 32 through 35 are sectional views of several forms of pressure wave generators for use in the apparatus of FIG. 35.

FIGS. 31 to 35 illustrate still another form of the apparatus according to this invention having a pressure wave generator 46 for cleaning a sensor element 8 of sludge and the like. Specific constructions of several forms of pressure wave generators which may be used in this embodiment are shown in FIGS. 32 to 35. Referring particularly to FIG. 32, a pressure wave generator 46 communicates through a conduit 14 with sensing device 9. The generator comprises a cylindrical enclosure 75 connected to the upper end of the conduit 14 and having an inner diameter greater than that of the conduit and a pressure piston 76 mounted for reciprocal movement into and away from the upper end portion of the conduit. A piston rod 77 is pivotally connected at one end to the piston 76. The other end of the piston rod is pivotally connected to a rotary disc 78 at an eccentric position thereof which is in turn secured to a rotating shaft of a drive motor 79 mounted on the undersurface of the top wall 75a of the enclosure 75. Thus, rotation of the disc 78 produces reciprocal movement of the piston 76 in the conduit 14 to compress the gas or test water in the conduit to thereby generate pressure waves.

Figure 33:
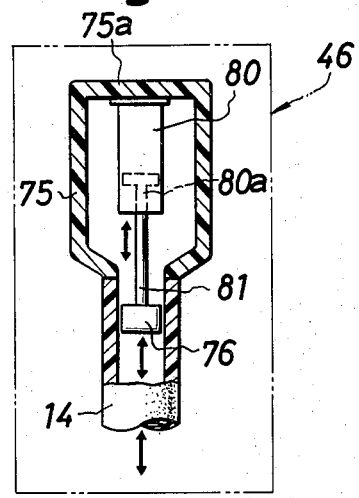

An alternate form of the pressure wave generator shown in FIG. 33 includes a pneumatically or hydraulically operated fluid cylinder 80 in place of the drive motor 79 and rotary disc 78 of FIG. 32. The fluid cylinder 80 is mounted on the inner surface of the top wall 75a of an enclosure 75. A reciprocable piston 80a in the cylinder is connected by means of a connection rod 81 to a pressure piston 76 which is adapted for reciprocal movement in the conduit 14. In this embodiment, the cylinder 80 is actuated by an external control means to axially reciprocate the pressure piston 76 by means of the rod 81 to thereby produce pressure waves in the conduit 14.

Figure 34:
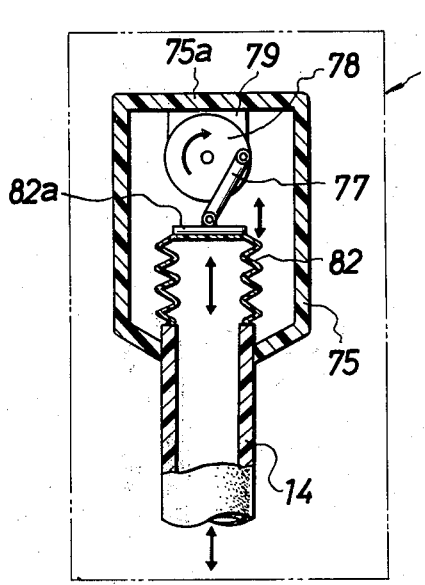
Figure 35:
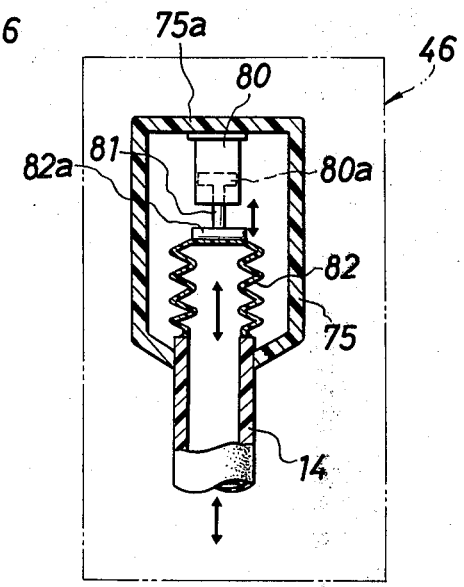

In the embodiments of FIGS. 34 and 35, an axially contractible bellows 82 is connected to the upper end of the conduit 14. The bellows serves as a pressure producing member in place of the piston arrangements shown in FIGS. 32 and 33. Secured to the top surface of the bellows 82 is a plate 82a to which is connected one end of a connection rod 77 in FIG. 34 or one end of a cylinder rod 82 in FIG. 35. Except for the bellows arrangement, the embodiments of FIGS. 34 and 35 are similar in construction to those of FIGS. 32 and 33, respectively.

In operation, referring to FIG. 32, for example, the piston 76 is actuated in axial reciprocal movements to cause the test water to forcedly move to and fro, as indicated by the arrows, to produce pressure waves. Therefore, as in the foregoing embodiments, the sensing face of the sensor is scoured substantially completely free of contaminants to ensure continued measurements in a condition free from contaminants and to extend the time intervals between maintenance operations. In addition, the sensor section is always supplied with fresh test water as is the case with the preceding embodiments. For the particular embodiment now being described, sensing devices as illustrated in FIGS. 14 and 15 may advantageously be used. The inner surfaces of the housing 14 of the sensing device which are to be placed into contact with the test water may have smooth curved contours as shown in FIGS. 14 and 15. Furthermore, the sensor element of the type as shown in FIG. 14 may be formed with a conical or hemispherical top end portion. All these arrangements will prevent small debris such as hair, rubber bands and the like, which may be in the test water, from adhering to the sensing device.

Figure 36:
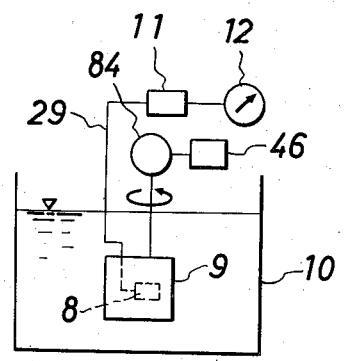
FIG. 36 is a block diagram of a still another form of the apparatus according to the present invention in which pressure waves are generated by rotating the sensing device.
Figure 37:
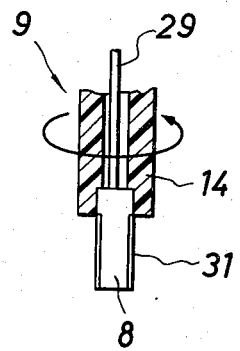
FIGS. 37 and 38 are schematic sectional views of sensing devices for use in the apparatus of FIG. 36.
Figure 38:
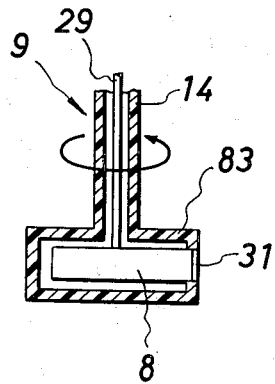

FIGS. 36 to 38 illustrate alternate embodiments of the invention characterized in moving the sensing device 9 and sensor element 8 rather than moving the test water.

In the embodiment of FIG. 37 in which the sensor element 8 is of the side face sensing type, the sensor element 8 is partially close fitted or threaded into or otherwise secured to the counterbore in the lower end of hollow shaft 14. Signal line 29 leads from the top of the sensor and extends upward through the shaft 14.

In the embodiment of FIG. 8 in which a forward end sensing type sensor is employed, the sensing device 9 comprises a hollow shaft 14 having a retainer housing 83 connected thereto at its lower end and sensor element 8 accommodated in the housing in such manner that the sensing face 31 alone is exposed to the test water.

Designated at 84 in FIG. 36 is a rotary drive means which normally rotates at a predetermined speed. The shaft 14 as shown in FIG. 14 or FIG. 15 is connected to an output shaft of the drive means. THe pressure wave generator 46 may comprise a timer in this embodiment which provides a signal at predetermined time intervals to the rotating machine 84 which normally rotates at a constant speed to abrupty vary the speed of revolution. A signal as measured at the sensor element is conveyed through the signal line 29, a slip ring (not shown), etc. to an amplifier 11.

If the sensing device 9 is used to determine the amount of dissolved oxygen, for example, in the water under investigation containing some contaminants which may adhere to the sensing face 31 of the sensor, the pressure wave generator 46 provides instructions to the drive means 84 at predetermined time intervals to halt or suddenly accelerate the rotation of the drive means 84. The abrupt increase of the rotational speed of the drive means also increases the centrifugal forces acting on the sensing face 31 to separate the adhering contaminants from the sensing face. Thus, the maintenance-free intervals can thus be extended.

Although all the embodiments have been described only in connection with dissolved oxygen meters, it should be understood that the present invention is not limited to the use of such meters but that it may be applicable to any other measuring instruments using electrodes as a sensor, such as pH meters and oxidation-reduction meters effecting electrochemical measurements and turbidity meters and suspended solid meters for effecting optical measurements.

What is claimed is:

1. Apparatus for determining amounts of matter in a liquid to be examined, which amounts serve as indices of the characteristics of the examined liquid, said apparatus comprising:

a. sensing means comprising a housing having a flow path for passage of the liquid to be examined therethrough and a sensor element accommodated in said housing and adapted to be immersed together with said housing in the liquid to detect said amounts of matter, said sensor element having a sensing surface positioned parallel to the flow direction of the liquid passing through the housing for contact with said liquid, the output of said sensor element being adapted to be indicated by an indicating means; and b. means for moving said liquid along said flow path including means disposed in said housing downstream of said sensing surface for introducing a medium into said liquid downstream of said sensing surface to advance the liquid along said flow path.

2. Apparatus according to claim 1 wherein the means for moving the liquid along the flow path comprises an air compressor and a pipe connected to the compressor for conveying compressed air therefrom, said means for introducing medium into the liquid downstream of the sensing surface including outlet means coupled to said pipe and disposed in said housing downstream of said sensor element.

3. Apparatus according to claim 1 wherein said housing has an inlet and an outlet for said liquid, said outlet means being disposed in said housing between said inlet and outlet.

4. Apparatus according to claim 3 wherein said housing has a lower end with said inlet thereat, and a cap mounted on a lower end of said housing, said cap being spaced from and covering the lower end of the housing, said cap having a side wall concentrically surrounding the housing to form a clearance space between the side wall of the cap and the housing to permit passage of the liquid therethrough into the housing.

5. Apparatus according to claim 3 wherein said sensor element extends axially and substantially centrally in the housing.

6. Apparatus according to claim 3 wherein said housing has an inner wall surface, said sensor element being mounted in said housing such that said sensing face of said sensor element is disposed in alignment with the inner wall surface of the housing.

7. Apparatus according to claim 3 wherein said housing around said sensor element includes a portion having a smaller inner diameter than the portion of said housing situated upstream and downstream of said sensor element.

8. Apparatus according to claim 3 wherein said housing has an internal passage leading to said outlet, said housing including a throat portion having a reduced inner diameter and a diffuser portion increasing progressively in inner diameter toward said outlet, said outlet means comprising a nozzle on said pipe for introducing fluid into the housing at a predetermined rate to move said liquid through said housing, said nozzle being disposed adjacent said throat portion and having an open end positioned upstream of an in alignment with said throat portion.

9. apparatus according to claim 8 comprising a directional control rudder externally secured on said housing to align the flow direction of said liquid passing through the housing with that of the liquid outside the housing.

10. Apparatus according to claim 1 wherein means for moving said liquid comprises air bubble producing means comprising an air compressor and a pipe, said means for introducing the medium into the liquid in the housing comprising outlet means coupled to said pipe for passing compressed air from said air compressor into said housing downstream of said sensor element.

11. Apparatus according to claim 10 wherein said outlet means is constituted by a plurality of smal holes in said pipe, and a discharge conduit at the outlet end of the housing extending above the level of the liquid outside the housing for discharging liquid together with air bubbles therein.

12. Apparatus according to claim 10 wherein said housing has a substantially annular cavity downstream of said sensor element and an inner wall bounding said cavity and being provided with a plurality of holes, said pipe being in communication with said cavity.

13. Apparatus according to claim 1 further comprising means for generating pressure waves in the liquid in said sensing means at a predetermined time to clean said sensor element, said means for moving the liquid comprising a conduit connecting the said sensing means and a source of liquid to be examined, and a pump disposed in said conduit for circulating liquid through said conduit and said housing, said pressure wave generating means comprising means for varying the lift of said pump at predetermined times.

14. Apparatus according to claim 13 wherein said housing includes a reduced throat portion and a diffuser portion having an inner diameter progressively increasing in the downstream direction, said means for introducing medium into said liquid including a nozzle on said pipe adjacent the inlet of said throat portion.

15. Apparatus according to claim 1 wherein said means for moving said liquid comprises a source of compressed gas, a first pipe means for passing compressed gas from said source into the housing of said sensing means downstream of said sensor element, said first pipe means having an end disposed in said housing, said means for introducing medium into the liquid being constituted by a plurality of holes in said end of the first pipe means, a liquid discharging conduit connected to said housing at the downstream end thereof and projecting into ambient air above the level of said liquid outside the housing, and means for generating pressure waves in said housing comprising a first valve disposed in said first pipe means for abruptly changing the flow of compressed air through said pipe means and a second valve disposed in said discharging conduit and adapted to close the discharging conduit when said first valve is operated to increase the air flow.

16. Apparatus according to claim 15 wherein said means for moving said liquid within said housing comprises a pump, and a conduit means coupled to said pump and having a flexible portion, said pump being adapted to circulate the liquid through said conduit means, said pressure generating means including means for applying an external pressure on the flexible portion of said conduit means to vary the sectional area of the flexible portion.

17. Apparatus according to claim 16 wherein said means of said pressure generating means comprises fixed and movable members embracing said conduit means therebetween, a biasing spring disposed between said two members to normally maintain the flexible portion of the conduit means in a noncompressed condition, a cam member for moving said movable member toward said fixed member against the force of said biasing spring to vary the sectional area of said flexible portion, and means for rotating said cam member.

18. Apparatus according to claim 16 wherein said means of said pressure generating means comprises a fixed member, a movable member pivotally connected at one end thereof to said fixed member, said fixed and movable members embracing said conduit means therebetween, a cam member for exerting a force on the other end of said movable member to compress the flexible portion of the conduit means, means for rotating said cam member and means for stopping said movable member at a predetermined position when said movable member is not under the pressure of the cam member.

19. Apparatus according to claim 16 wherein said means of said pressure generating means comprises a fixed member supporting said conduit means, a movable member, said fixed and movable members embracing said conduit means therebetween, a solenoid magnet connected to said movable member and adapted, when energized, to move the member toward the fixed member to vary the sectional area of the flexible portion of said conduit means, and a biasing spring for maintaining the movable member in such a position as not to compress said flexible portion when said solenoid magnet is de-energized.

20. Apparatus for determining amounts of matter in a liquid to be examined which amounts serve as indices of the characteristics of said liquid, said apparatus having means for indicating the detected amounts, said apparatus comprising sensing means comprising a housing adapted to pass said liquid therethrough and a sensor element accommodated in said housing and immersed together with said housing in said liquid to detect said amounts of matter, said sensor element having a sensing face disposed parallel to the direction of flow of the liquid passing through said housing for contact with the liquid, said sensor element having an output adapted to be indicated by said indicating means, means for generating pressure waves in said liquid in said housing at a predetermined time to clean said sensor element of matter adhered thereto due to the use of said sensor element in the liquid, and means for moving said liquid relative to the sensor element at a predetermined rate.

21. Apparatus according to claim 20 wherein said pressure wave generating means includes a piston in said housing and means for actuating said piston including a rotatable disc, and a rod pivotally connected at one end thereof to said disc at an eccentric location thereon and pivotally connected at the other end to said piston.

22. Apparatus according to claim 20 wherein said pressure wave generating means includes a bellows connected to and sealing one end of said housing, and means for extending and contracting said bellows to generate pressure waves comprising a rotatable disc, and a rod connected at one end thereof to one end of said bellows and at the other end of said disc at an eccentric location thereon.

23. Apparatus according to claim 20 wherein said means for moving the test liquid comprises a conduit communicating with said liquid within said sensing means, and a pump coupled to said conduit for circulating said liquid through said conduit, the interior of said housing, and source of said liquid, said pressure generating means comprising means for varying the lift of said pump at a desired time.

24. Apparatus for determining amounts of matter in a liquid to be examined which amounts serve as indices of the characteristics of said test liquid, said apparatus comprising:
   a. sensing means comprising a housing for passage of said liquid therethrough and a sensor element in said housing and immersed together with said housing in said liquid to detect said amount of matter, said sensor element having a sensing face disposed parallel to the flow direction of the liquid passing through the housing for contact by said liquid,
   b. means for moving said liquid relative to the sensor element at a predetermined rate,
   c. means for blowing a predetermined gas against said sensor element,
   d. switching-over means for actuating alternately said means for moving said liquid within said sensing means and said gas blowing means,
   e. means for indicating output of said sensor element, and
   f. mean for compensating for the output from said sensor element so that any deviation between a reference value and an output provides by the sensor element when said gas is blown against the sensor element is nullified.

25. Apparatus according to claim 24 whrein said means for moving the liquid comprises a conduit connecting the interior of said housing with an external source of said liquid, and a pump disposed in said conduit for moving said liquid through the conduit, said gas blowing means comprising an air compressor and a conduit for directing compressed air from said air compressor to said sensor element, saiid switching-over means comprising switch-over valves disposed in said liquid conduit and said compressed air conduit, respectively and a timer for selectively controlling the operation of said valves.

26. Apparatus according to claim 24 wherein said compensating means comprises a servomechanism means adapted to provide a movement of an amount corresponding to any deviation between said reference value and the output of the sensor element when said gas is blown against said sensor element, and an adjustment means secured to said servomechanism means for concurrent movement therewith to conform the magnitude of the output of the sensor element with said reference value.

27. Apparatus according to claim 24 comprising means for directing clean liquid against said sensor element to scour the sensor element of contaminants adhered thereto.

* * * * *